US007840433B2

(12) United States Patent
Boss et al.

(10) Patent No.: US 7,840,433 B2
(45) Date of Patent: Nov. 23, 2010

(54) FLUID, DEPLETING CHIPS FOR OBTAINING DESIRED SERVICE LEVEL CHARACTERISTICS

(75) Inventors: Gregory J. Boss, American Fork, UT (US); Christopher J. Dawson, Arlington, VA (US); Rick A. Hamilton, II, Charlottesville, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 11/756,325

(22) Filed: May 31, 2007

(65) Prior Publication Data

US 2008/0301026 A1 Dec. 4, 2008

(51) Int. Cl.
G05B 19/418 (2006.01)
G06F 9/45 (2006.01)
G06Q 10/00 (2006.01)
G06Q 30/00 (2006.01)
(52) U.S. Cl. .......................................... 705/8; 705/1.1
(58) Field of Classification Search ...................... 705/1
See application file for complete search history.

(56) References Cited

U.S. PATENT DOCUMENTS

| 5,371,780 | A | 12/1994 | Amitay |
| 6,236,981 | B1 * | 5/2001 | Hill ............................. 705/67 |
| 6,550,881 | B1 | 4/2003 | Phillips |
| 6,553,568 | B1 | 4/2003 | Fijolek et al. |
| 6,678,700 | B1 | 1/2004 | Moore et al. |
| 6,732,140 | B1 | 5/2004 | McCue |
| 6,754,739 | B1 | 6/2004 | Kessler et al. |
| 6,842,899 | B2 | 1/2005 | Moody et al. |
| 6,859,927 | B2 | 2/2005 | Moody et al. |
| 6,925,493 | B1 | 8/2005 | Barkan et al. |
| 6,947,987 | B2 | 9/2005 | Boland |
| 6,968,323 | B1 * | 11/2005 | Bansal et al. ................. 705/80 |
| 7,062,559 | B2 | 6/2006 | Yoshimura et al. |
| 7,099,681 | B2 | 8/2006 | O'Neill |
| 7,103,580 | B1 | 9/2006 | Batachia et al. |
| 7,103,847 | B2 | 9/2006 | Alford, Jr. et al. |
| 7,249,099 | B2 * | 7/2007 | Ling ............................ 705/41 |
| 7,266,523 | B2 | 9/2007 | Depura et al. |
| 7,401,035 | B1 | 7/2008 | Young |
| 2001/0042032 | A1 | 11/2001 | Crawshaw et al. |

(Continued)

OTHER PUBLICATIONS

Boss et al, U.S. Appl. No. 11/756,360, END920060218US1, Office Action Communication, Apr. 24, 2009, 12 pages.

(Continued)

*Primary Examiner*—John G Weiss
*Assistant Examiner*—Candice D Carter
(74) *Attorney, Agent, or Firm*—William Schiesser; Hoffman Warnick LLC

(57) ABSTRACT

The present invention provides fluid, depleting chips for allocating computational resources for obtaining desired service level characteristics, wherein fluid chips deplete from a maximum allocated amount but may, in an optional implementation, be allowed to be replenished through the purchase of additional chips. A number of chips are assigned to the requestor/party, known as the business unit (BU), which could be a department, or group providing like-functionality services. In one implementation, the chips themselves could represent base monetary units integrated over time.

21 Claims, 4 Drawing Sheets

U.S. PATENT DOCUMENTS

| | | | |
|---|---|---|---|
| 2002/0065766 A1* | 5/2002 | Brown et al. | 705/37 |
| 2002/0073014 A1 | 6/2002 | Gilbert | |
| 2002/0091624 A1 | 7/2002 | Glodjo et al. | |
| 2002/0128949 A1 | 9/2002 | Wiesehuegel et al. | |
| 2002/0135796 A1* | 9/2002 | Alexander | 358/1.15 |
| 2002/0174052 A1 | 11/2002 | Guler et al. | |
| 2003/0018562 A1 | 1/2003 | Guler et al. | |
| 2003/0023540 A2 | 1/2003 | Johnson et al. | |
| 2003/0035429 A1 | 2/2003 | Mitra et al. | |
| 2003/0041007 A1 | 2/2003 | Grey et al. | |
| 2003/0041011 A1 | 2/2003 | Grey et al. | |
| 2003/0041014 A1 | 2/2003 | Grey et al. | |
| 2003/0055729 A1 | 3/2003 | Bezos et al. | |
| 2003/0069828 A1* | 4/2003 | Blazey et al. | 705/37 |
| 2003/0071861 A1 | 4/2003 | Phillips | |
| 2003/0083926 A1 | 5/2003 | Semret et al. | |
| 2003/0101124 A1 | 5/2003 | Semret et al. | |
| 2003/0167329 A1 | 9/2003 | Kurakake et al. | |
| 2003/0216971 A1 | 11/2003 | Sick et al. | |
| 2004/0010592 A1 | 1/2004 | Carver et al. | |
| 2004/0024687 A1 | 2/2004 | Delenda | |
| 2004/0059646 A1 | 3/2004 | Harrington et al. | |
| 2004/0111308 A1 | 6/2004 | Yakov | |
| 2004/0133506 A1 | 7/2004 | Glodjo et al. | |
| 2004/0133609 A1 | 7/2004 | Moore et al. | |
| 2004/0230317 A1 | 11/2004 | Kumar et al. | |
| 2005/0055306 A1 | 3/2005 | Miller et al. | |
| 2005/0071182 A1 | 3/2005 | Aikens et al. | |
| 2005/0141554 A1 | 6/2005 | Hammarlund et al. | |
| 2005/0207340 A1 | 9/2005 | O'Neill | |
| 2005/0256946 A1 | 11/2005 | Childress et al. | |
| 2005/0278240 A1 | 12/2005 | Delenda | |
| 2006/0080210 A1 | 4/2006 | Mourad et al. | |
| 2006/0080224 A1 | 4/2006 | Schuelke | |
| 2006/0080438 A1 | 4/2006 | Storrie | |
| 2006/0149652 A1 | 7/2006 | Fellenstein et al. | |
| 2006/0167703 A1 | 7/2006 | Yakov | |
| 2006/0195386 A1 | 8/2006 | Glodjo et al. | |
| 2007/0136176 A1 | 6/2007 | Niedermeier | |
| 2007/0276688 A1 | 11/2007 | Sun et al. | |

OTHER PUBLICATIONS

Boss et al, U.S. Appl. No. 11/755,985, END920060223US1, Office Action Communication, Apr. 1, 2009, 23 pages.

Duermeyer, Karin, "Methodology: From Component Business Model to Service Oriented Architecture", Copyright IBM Corporation 2004.

U.S. Appl. No. 11/756,416, filed May 31, 2007, Office Action dated Oct. 14, 2009.

U.S. Appl. No. 11/756,360, filed May 31, 2007, Final Office Action dated Oct. 14, 2009.

U.S. Appl. No. 11/756,400, filed May 31, 2007, Office Action dated Oct. 8, 2009.

U.S. Appl. No. 11/756,386, filed May 31, 2007, Office Action dated Oct. 8, 2009.

U.S. Appl. No. 11/755,985, filed May 31, 2007, Final Office Action dated Nov. 2, 2009.

U.S. Appl. No. 11/756,426, filed May 31, 2007, Office Action dated Oct. 29, 2009.

U.S. Appl. No. 11/756,360, END920060218US1, Office Action dated Feb. 8, 2010.

U.S. Appl. No. 11/755,985, END920060223US1, Office Action, dated Jan. 29, 2010.

U.S. Appl. No. 11/756,426, filed May 31, 2007, Final Office Action dated Mar. 24, 2010, 20 pages.

U.S. Appl. No. 11/756,416, filed May 31, 2007, Final Office Action dated Mar. 24, 2010, 14 pages.

U.S. Appl. No. 11/756,400, filed May 31, 2007, Final Office Action dated Mar. 24, 2010, 20 pages.

U.S. Appl. No. 11/756,386, filed May 31, 2007, Final Office Action dated Mar. 24, 2010, 14 pages.

U.S. Appl. No. 11/756,426, Advisory Action dated Jun. 8, 2010, 3 pages.

U.S. Appl. No. 11/756,400, Advisory Action dated Jun. 8, 2010, 3 pages.

U.S. Appl. No. 11/756,360, Notice of Allowance and Fees Due dated May 19, 2010, 6 pages.

U.S. Appl. No. 11/755,985, filed May 31, 2007, Final Office Action dated Jul. 1, 2010, 23 pages.

U.S. Appl. No. 11/756,416, filed May 31, 2007, Notice of Allowance and Fees due dated Jun. 30, 2010, 4 pages.

U.S. Appl. No. 11/756,313, filed May 31, 2007, Office Action dated Jun. 29, 2010, 31 pages.

U.S. Appl. No. 11/756,386, filed May 31, 2007, Notice of Allowance and Fees due dated Jun. 29, 2010, 4 pages.

U.S. Appl. No. 11/756,400, filed May 31, 2007, Office Action dated Jun. 24, 2010, 12 pages.

U.S. Appl. No. 11/756,426, filed May 31, 2007, Office Action dated Jun. 24, 2010, 10 pages.

Ozsomer et al., "A Resource-Based Model of Market Learning in the Subsidiary: The Capabilities of Exploration and Exploitation", Journal of International Marketing, vol. 11, No. 3, 2003.

Staudenmayer, Nancy, "Interdependency: Conceptual, Empirical, and Practical Issues", The International Center for Research on the Management of Technology, Jun. 1997.

\* cited by examiner

FLUID, DEPLETING CHIPS FOR OBTAINING DESIRED SERVICE LEVEL CHARACTERISTICS

CROSS-REFERENCE TO RELATED APPLICATIONS

This application is related in some aspects to commonly owned patent application Ser. No. 11/756,364, entitled "RESOURCE MANAGEMENT FRAMEWORK", filed concurrently herewith, the entire contents of which are herein incorporated by reference.

This application is related in some aspects to commonly owned patent application Ser. No. 11/756,360, entitled "METHOD, SYSTEM, AND PROGRAM PRODUCT FOR SELECTING A BROKERING METHOD FOR OBTAINING DESIRED SERVICE LEVEL CHARACTERISTICS", filed concurrently herewith, the entire contents of which are herein incorporated by reference.

This application is related in some aspects to commonly owned patent application Ser. No. 11/756,374, entitled "NON-DEPLETING CHIPS FOR OBTAINING DESIRED SERVICE LEVEL CHARACTERISTICS", filed concurrently herewith, the entire contents of which are herein incorporated by reference.

This application is related in some aspects to commonly owned patent application Ser. No. 11/756,357, entitled "DISCRETE, DEPLETING CHIPS FOR OBTAINING DESIRED SERVICE LEVELOF CHARACTERISTICS", filed concurrently herewith, the entire contents of which are herein incorporated by reference.

FIELD OF THE INVENTION

The present invention generally relates to the brokering of biddable resources (e.g., computational resources). Specifically, the present invention addresses the need for using fluid, depleting chips for obtaining desired service level characteristics.

BACKGROUND OF THE INVENTION

Businesses are experiencing an ever-increasing trend to achieve higher utilization of computing resources. Companies that provide their own IT computing services are being driven to find ways to decrease costs by increasing utilization. Moreover, companies that provide these services are being driven to reduce overhead and become more competitive by increasing utilization of these resources. Numerous studies over the past decade have shown that typical utilization levels of computing resources within service delivery centers, raised floors, and data centers fall between 20% and 80%. This leaves a tremendous amount of white space with which to improve utilization and drive costs down.

These issues are compounded by the fact that, in many instances, multiple parties compete for common resources. Such competition can occur both on an inter-organization level as well as on an intra-organization level (e.g., between business units). To this extent, none of the existing approaches address how many resources a particular party is allowed to consume. That is, none of the existing approaches provide a way to adequately ration a party the computational resources in a way that will fulfill its needs, while not preventing the needs of other parties from being met. Accordingly, there exists a need in the art to overcome the deficiencies and limitations described hereinabove.

SUMMARY OF THE INVENTION

The application of the present invention generally provides details on the nature of fluid, depleting chips, wherein fluid chips deplete from a maximum allocated amount but may, in an optional implementation, be allowed to be replenished through the purchase of additional chips. A number of chips are assigned to a requestor/party, known as a business unit (BU), which could be a department, or group providing like-functionality services. In one implementation, the chips themselves could represent base monetary units integrated over time.

In this concept, the number of chips is depleted over some period of time, which helps to balance the requestor's relationship with a resource unit broker. That is, when a party bids a certain amount of chips for a computational resource, and that party's bid is accepted, its total quantity of chips will be debited by the amount of chips bid. Using a chip maximum over a finite duration, e.g. 10,000 chips over one month, implies that the requestor has until the end of the period of time to utilize all of its chips to attempt to win bids for elemental bidding resources (EBR). Again, they may optionally be allowed to acquire additional chips if they deplete its supply prior to the end of the allocation period. The method of acquiring new chips would depend on existing business policies or practices, and is not the focus of this application. This chip management mechanism would be leveraged in conjunction with the concepts and algorithms provided in other applications, for the purposes of brokering an exchange of chips for EBRs for periods of high resource demand.

A first aspect of the present invention provides a method for allocating a supply of fluid, depleting chips for obtaining desired service level characteristics, comprising: allocating a party a fixed quantity of chips for bidding on a computational resource; receiving a bid for the computational resource using an amount of the fixed quantity of chips pursuant to a fluid event for the computational resource; and debiting the fixed quantity of chips by the amount in response to the party being awarded the computational resource.

A second aspect of the present invention provides a system for allocating a supply of fluid, depleting chips for obtaining desired service level characteristics, comprising: a system for allocating a party a fixed quantity of chips for bidding on a computational resource; a system for receiving a bid for the computational resource using an amount of the fixed quantity of chips pursuant to a fluid event for the computational resource; and a system for debiting the fixed quantity of chips by the amount in response to the party being awarded the computational resource.

A third aspect of the present invention provides a program product stored on a computer readable medium for allocating a supply of fluid, depleting chips for obtaining desired service level characteristics, the computer readable medium comprising program code for causing a computer system to: allocate a party a fixed quantity of chips for bidding on a computational resource; receive a bid for the computational resource using an amount of the fixed quantity of chips pursuant to a fluid event for the computational resource; and debit the fixed quantity of chips by the amount in response to the party being awarded the computational resource.

A fourth aspect of the present invention provides a method for deploying a system for allocating a supply of fluid, depleting chips for obtaining desired service level characteristics, comprising: providing a computer infrastructure being operable to: allocate a party a fixed quantity of chips for bidding on a computational resource; receive a bid for the computational resource using an amount of the fixed quantity of chips pursuant to a fluid event for the computational resource; and debit the fixed quantity of chips by the amount in response to the party being awarded the computational resource.

A fifth aspect of the present invention provides computer software embodied in propagated signal for allocating a supply of fluid, depleting chips for obtaining desired service level characteristics, the computer software comprising instructions for causing a computer system to: allocate a party a fixed quantity of chips for bidding on a computational resource; receive a bid for the computational resource using an amount of the fixed quantity of chips pursuant to a fluid event for the computational resource; and debit the fixed quantity of chips by the amount in response to the party being awarded the computational resource.

A sixth aspect of the present invention provides a data processing system for allocating a supply of fluid, depleting chips for obtaining desired service level characteristics, comprising: a memory medium; a bus coupled to the memory medium; and a processing unit coupled to the bus, the memory medium comprising program code, which when executed by the processing unit, causes the data processing system to: allocate a party a fixed quantity of chips for bidding on a computational resource; receive a bid for the computational resource using an amount of the fixed quantity of chips pursuant to a fluid event for the computational resource; and debit the fixed quantity of chips by the amount in response to the party being awarded the computational resource.

For each of these aspects, the following additional features/functions can be provided: the party can be a business unit or the like; the bid can be received pursuant to an unscheduled offer for the computational resource; the bid can be one of a plurality of bids received pursuant to the unscheduled offer for the computational resource; the fixed quantity of chips can be allocated pursuant to a business transaction such as a financial transaction; the bid can be received by a resource unit broker from an agent acting on behalf of the party; the resource unit broker can select from a plurality of available algorithms for identifying a winner of the computational resource, etc.

BRIEF DESCRIPTION OF THE DRAWINGS

These and other features of this invention will be more readily understood from the following detailed description of the various aspects of the invention taken in conjunction with the accompanying drawings in which.

Figure 1:
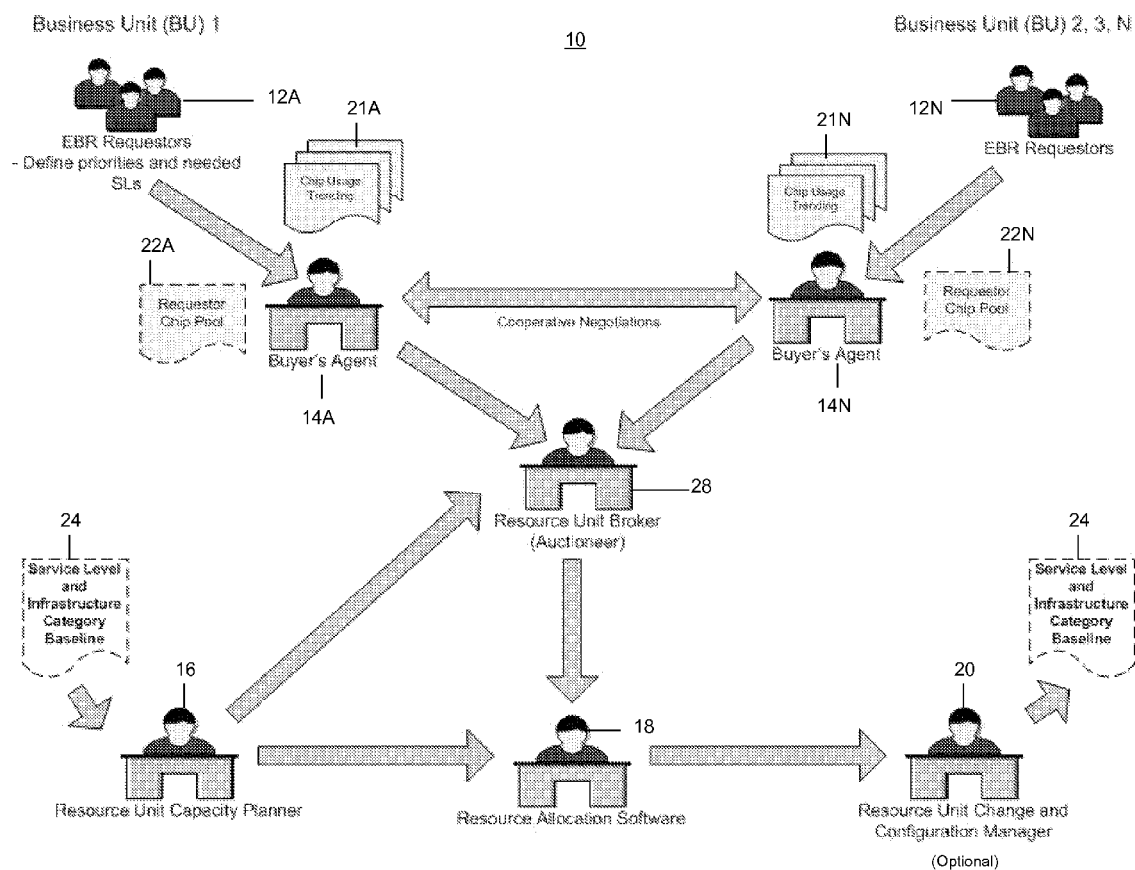
FIG. 1 shows an illustrative resource management framework according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:

I. General Description
II. Computerized Implementation

I. General Description

As used herein, the following terms have the following definitions:

"Chip" means any unit (virtual or otherwise) that may be exchanged for resources such as IT resources.

"Party" means any individual, group of individuals, department, business unit, cell of a component business model, etc.

"Discrete Event" means a scheduled event such as an auction.

"Fluid Event" means any non-scheduled event such as a random purchase.

"Service Level Characteristic" means any type of computer or IT requirement needed by the business, including any non-functional requirements that specify criteria that can be used to judge the operation of a system, rather than specific behaviors.

"Elemental Bidding Resource (EBR)" means any computational resource (e.g., memory, processing cycles, etc.) sought by a party to accomplish objectives.

As indicated above, the present invention provides details on the nature of fluid, depleting chips, wherein fluid chips deplete from a maximum allocated amount but may, in an optional implementation, be allowed to be replenished through the purchase of additional chips. A number of chips are assigned to a requestor/party, known as a business unit (BU), which could be a department, or group providing like-functionality services. In one implementation, the chips themselves could represent base monetary units integrated over time.

In this concept, the number of chips is depleted over some period of time, which helps to balance the requestor's relationship with the resource unit broker. That is, when a party bids a certain amount of chips for a computational resource (i.e., pursuant to a fluid event), and that party's bid is accepted, its total quantity of chips will be debited by the amount of chips bid. Using a chip maximum over a finite duration, e.g. 10,000 chips over one month, implies that the requestor has until the end of the period of time to utilize all of its chips to attempt to win bids for elemental biddable resources (EBR). Again, they may optionally be allowed to acquire additional chips if they deplete their supply prior to the end of the allocation period. The method of acquiring new chips would depend on existing business policies or practices, and is not the focus of this application. This chip management mechanism would be leveraged in conjunction with the concepts and algorithms provided in other applications, for the purposes of brokering an exchange of chips for EBRs during periods of high resource demand.

Referring now to FIG. 1, a resource management framework (hereinafter framework 10) is depicted as described in Ser. No. 11/756,367, which was cross-referenced and incorporated above. As shown, framework 10 is generally comprised of business units 12A-N, buyer's agents 14A-N, resource unit capacity planner 16, resource allocation software 18, optional resource unit change and configuration manager 20, and resource unit broker 28. These components typically leverage additional assets such as chip trending usage 21A-N, requestor chip pool 22A-N, and service level and infrastructure category baseline 24.

An objective of this framework 10 is to reach a means of maximizing utilization of IT Resources among competing consumers such as business units 12A-N by distribution of the decision making/allocation process according to relative needs of applications. Doing so eliminates the need for traditional Service Level Agreements (SLAs), and allows each business unit to make dynamic "free market" decisions as to how best obtain the service levels required from a highly-commoditized IT service provider.

To this end, business units 12A-N relay their priorities and computing needs to the buyer's agents 14A-N. Buyer's agents 14A-N then determine whether to engage in cooperative or competitive negotiations and implement a request for an EBR on the business units' 12A-N behalf. Various methods can be employed by the resource unit broker 28 to fulfill requests for resources to consumers or business units 12A-N. One method is using non-depleting chips (as further described in Ser. No. 11/756,374, which was cross-referenced and incorporated above), and yet another involves the use of discrete, depleting chips (as further described in Ser. No. 11/756,357, which was cross-referenced and incorporated above). Another method is described herein and involves the use of fluid, depleting chips. Regardless, the buyers' agents 14A-N understands the thresholds business units 14A-N are willing to pay, their associated targets for various service level characteristics, and will programmatically employ the most advantageous bidding strategy.

The resource unit capacity planner 16 reports to resource unit brokers 28 (i.e., auctioneers) what resources are available (e.g., infrastructure components) at any given time. Resource allocation software 18 includes products such as EWLM (Enterprise Workload Manager), WebSphere XD, and Partition Load Manager (EWLM, Enterprise Workload Manager, WebSphere XD, and Partition Load Manage are trademarks of IBM Corp. in the United States and/or other countries). The goal-oriented policies within these products are updated by inputs from the resource unit broker 28 and/or resource unit broker capacity 16. Change management may be all self-contained in resource allocation software 18, or there may be cases where additional change control needs to be performed. This functionality is provided herein by optional resource unit change and configuration manager 20.

As indicated above, the present invention involves the allocation of fluid, depleting chips to parties such as business units 12A-N. That is, business units 12A-N will be allocated a certain/fixed quantity of chips pursuant to a business transaction (e.g., a financial transaction). Those chips can then be used for bidding in an attempt to be allocated computational resources. The chips are considered fluid because they are intended to be used for an unscheduled event such as an unscheduled offer.

Consider, for the sake of simplicity, the case where only two business units are competing for IT resources. These business units will be known simply as BU1 and BU2, and each are represented by their own respective agent software. In the fluid chip model, periodic, unscheduled events such as auctions are held, and winners determined for the duration of the allocation cycle, such that resources are distributed accordingly. Specifically, agents 14A-N will submit bids on behalf of business units 12A-N. Each bid is for an amount (e.g., one or more) of quantity of chips that were allocated to business units 12A-N. It should be noted that each business unit 12A-N is not necessarily allocated the same amount of chips. For example, business unit "A" may be able to purchase more chips than business unit "B". In any event, resource unit broker 28 will act as an auctioneer and determine a winner. As part of its role, resource unit broker 28 will communicate with resource unit capacity planner 16 and resource allocation software 18 as outlined above.

Figure 2:
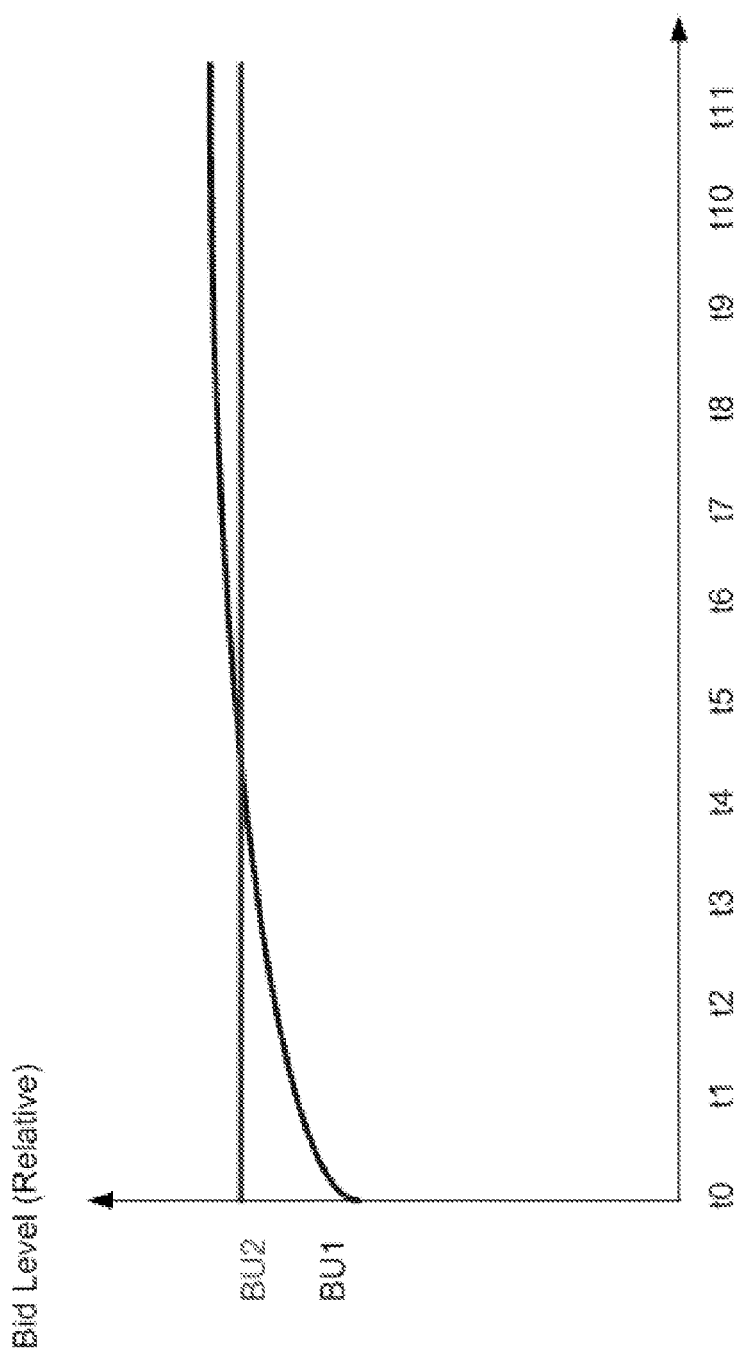
FIG. 2 shows an illustrative graph of two business units competing for resources over time according to an embodiment the present invention.

Referring now to the example shown in FIG. 2, BU1 is the low bidder for resources at time zero. Whereas, in a discrete chip case, this would entitle BU2 to have the "won" resources for some predefined period of time, in this fluid chip case, no time guarantees are given. In the example below, BU1 increases the bid amount over time, such that it eventually passes BU2 between times t4 and t5. In doing so, reallocation of resources is accomplished from BU2 to BU1, according to one of the three allocation strategies presented herein and/or incorporated.

Figure 3:
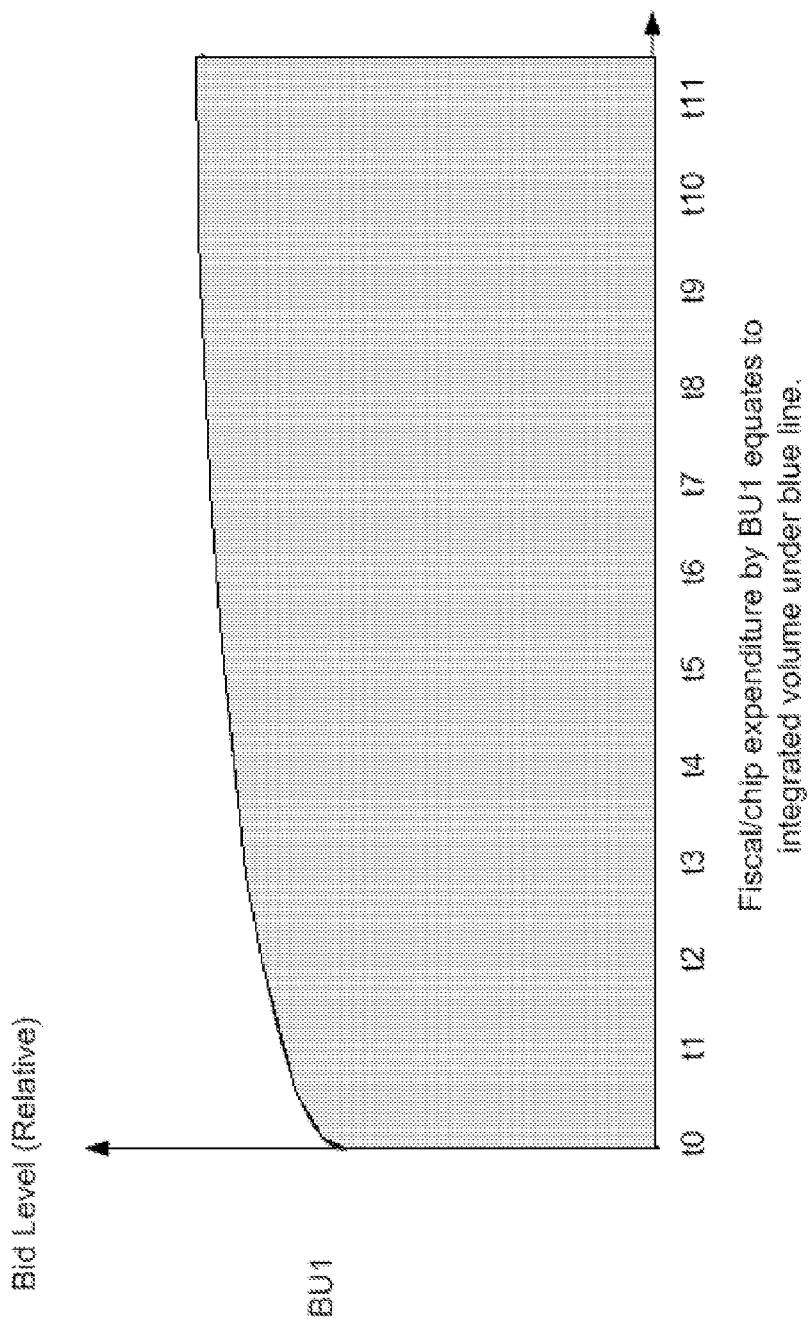
FIG. 3 shows an illustrative graph of fiscal/chip expenditure over time for one of the business units depicted in FIG. 2 according to an embodiment the present invention.

Referring now to FIG. 3, the relationship between the curves shown and chips expended is illustrated. In FIG. 3, consider that the area under a bid curve, when integrated over time, represents the depletion of chips from the affected business unit. In the diagram for instance, one area represents the cumulative expenditure of chips (or associated money) for the time shown. Likewise, a similar curve could be generated for the other bidding BU. In either case, the expenditure may be represented by the comprehensive area shown.

Note that for all chip management systems, including this one, cooperative behavior may optionally first be tried before bidding competition ensues.

Note furthermore that three allocation strategies follow, and of course influence, the bidding process. Any of these strategies may be implemented, according to the behavior that is deemed optimal for the adopting organization.

These strategies are as follows:

"Winner Take All" Allocation: In this approach, the business unit with the highest bid is allocated all requested IT resources. No other business units receive IT resources, until the bid winner changes. With the fluid chip approach outlined above, this has the practical effect of saying whichever business unit is currently (at any given moment in time) bidding the highest amount of fluid chips will receive full use of the IT resource under bid. Such a resource (the EBR) could be a given machine, a given number of processors, memory, or input/output capability, or any other such elemental bidding resource.

Extrapolating out from the "chip expenditure" and "relative bid level" charts, consider that in the winner take all allocation, the BU1 (blue) expenditures would be nothing until time t4.5, as the only expenditures prior to that point would be those of the BU2 (red), and represented by the area beneath the BU2 curve. Past time t4.5, the only expenditures would be those of the BU1 (blue), and represented by the area under that curve, accordingly.

"Ratio of Resources" Allocation: In this approach, the requested resources are allocated according to a ratio of bids between competing business units. An example of this would be seen if two competing BUs are bidding on a resource, and the ratio of relative bids at a particular time is 2/1 between Business Unit 2 and Business Unit 1, respectively. In this case, BU2 gets 66.7% of the requested resource, and BU1 gets 33.3% of the requested resource. In the fluid chip example currently under consideration, increasing the number of chips (i.e., the burn rate) would result in "spot" reallocation according to the new ratios derived by the new bid(s).

Extrapolating again from the charts of FIGS. 2-3, for the ratio of resources allocation, expenditures would equate at all times to both the areas beneath the BU1 (blue) curve and the BU2 (red) curve. Each represents an active expenditure of chips, and the resources allocated accordingly would equate to the ratio between these two BUs' expenditures.

Note furthermore that, in the case where competing bids were staying relatively constant, certain techniques could be used to "down shift" the bids so that BU chips would not be depleted unnecessarily. In other words, if two BUs were bidding a steady state 10 and 20 chips and were satisfied that service level requirements, these bids could simultaneously be dropped down to 1 and 2 chips, respectively, through either broker manipulation or direct communication between the BUs. Doing so would ensure that both (all) BUs continued to receive the same levels of performance from the EBR, but the chips would not be prematurely depleted in obtaining this service level.

"Harvested Capacity (HC)" Allocation: This approach has some similarities with the "winner take all" approach, in that the BU placing the highest bid at any given time gets all the capacity they need for the duration in which their bid is the highest. However, in the harvested capacity approach, any remaining resources after the winner takes what they need are available for use by other BUs. In the fluid chip case, the differentiation between the "ratio of resources" approach and "harvested capacity" is far more subtle than it is in the discrete chip case. To illustrate, in the discrete chip case, where finite bid cycles exist, HC allocation means that as the winner's processing needs vary throughout the bid cycle, the amount of resources available to the bid loser(s) vary accordingly. In the discrete chip case, the ratio of resources (RoR) allocation means that the winner and loser(s) are allocated certain percentages of the resources for that bid cycle, regardless of the specific processing needs of a business unit at a given time. In the fluid chip case, however, the concept of bid cycle does not exist, and thus RoR and HC may be viewed almost synonymously, where the remaining resources may be "skimmed" by either the second place bidder, or a combination of all "losing" bidders.

Extrapolating again from FIGS. 2-3, the harvested capacity case for fluid chips could see expenditures either (a) synonymous with the ratio of resources case; (b) expenditures for the winner only, with harvested capacity in effect being free for the "losing" BU; or (c) expenditures primarily for the bid winner, but with some form of preset or dynamically determined "nominal" fee for the right of the "losing" BU to take harvested capacity when it's available.

Thus, the specification and quantification of these fluid chips may occur through a number of methods, but their measure in use by the system may be thought of as a differential, such as chips per unit of time. As mentioned for other chip strategies, several fundamental implementation options exist for practical use of this system. In one case, a business unit within an organization may receive through executive sponsor a specified amount of chips for a given period of time, and that is all the chips they receive until the next replenishment date. In another case, a business unit may receive through executive sponsor a specified amount of chips for a given period of time, and then additional chips may be purchased through discretionary expenditures authorized by the business unit. In a third option, the chips may be equated to simple fiscal terms, and the free market will determine the relative "wealth" of competing business units. This last approach would be best suited for true competitive situations, in which the BU's are not necessarily part of the same broader organization with shared goals.

II. Computerized Implementation

Figure 4:
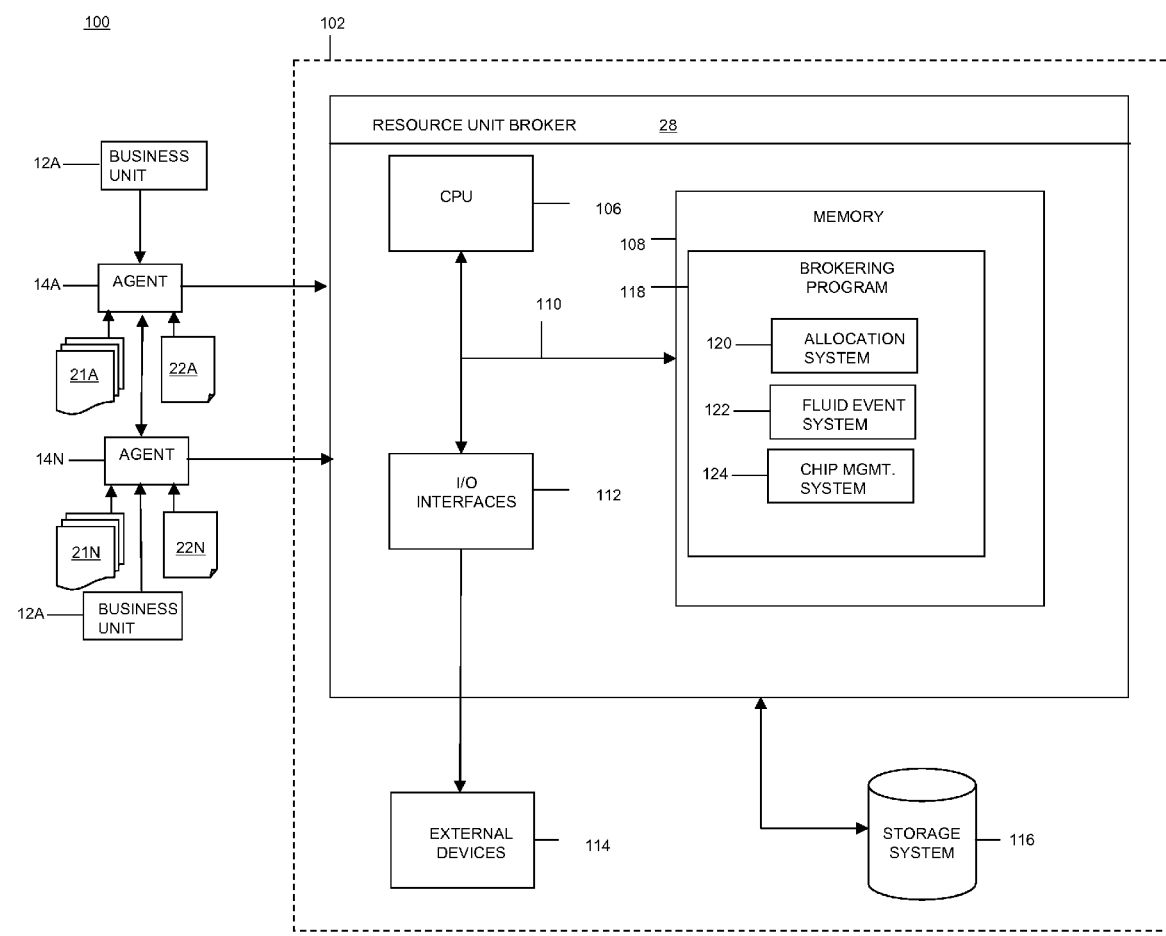
FIG. 4 shows a more detailed computerized implementation of the present invention.

Referring now to FIG. 4, a more detailed diagram of a computerized implementation 100 of the present invention is shown. As depicted, implementation 100 includes resource unit broker 28 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, resource unit broker 28 includes a processing unit 106, a memory 108, a bus 110, and input/output (I/O) interfaces 112. Further, resource unit broker 28 is shown in communication with external I/O devices/resources 114 and storage system 116. In general, processing unit 106 executes computer program code, such as brokering program 118, which is stored in memory 108 and/or storage system 116. While executing computer program code, processing unit 106 can read and/or write data to/from memory 108, storage system 116, and/or I/O interfaces 112. Bus 110 provides a communication link between each of the components in resource unit broker 28. External devices 114 can comprise any devices (e.g., keyboard, pointing device, display, etc.) that enable a user to interact with resource unit broker 28 and/or any devices (e.g., network card, modem, etc.) that enable resource unit broker 28 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, resource unit broker 28 is only representative of various possible computer systems that can include numerous combinations of hardware. To this extent, in other embodiments, resource unit broker 28 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external device 114. Still further, it is understood that one or more additional components (e.g., system software, math co-processing unit, etc.) not shown in FIG. 4 can be included in resource unit broker 28. However, if resource unit broker 28 comprises a handheld device or the like, it is understood that one or more external devices 114 (e.g., a display) and/or storage system 116 could be contained within resource unit broker 28, not externally as shown.

Storage system 116 can be any type of system (e.g., a database) capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into resource unit broker 28. It should be understood that resource unit capacity planner 16, resource allocation software 18, and change and configuration manager 20 have not been shown in FIG. 4 for clarity purposes.

Shown in memory 108 of resource unit broker 28 is brokering program 118, which facilitates the functions of resource unit broker 28 as described above. It should be understood that brokering program 118 could include any of the subsystems shown in the above-incorporated applications. Those shown in FIG. 4 have been depicted to illustrate the core functions of the fluid, depleting chip model of the present invention. As depicted, brokering program 118 includes allocation system 120, fluid event system 122, and chip management system 124. It should be understood that this configuration of functionality is intended to be illustrative only, and that identical or similar functionality could be provided with a different configuration of systems.

In any event, brokering program 118 facilitates the functions as described above. Specifically, allocation system 120 is configured to allocate a party a fixed quantity of fluid chips for obtaining a computational resource. This can incorporate details of a business transaction between the party and a chip source such as a financial exchange for a fixed quantity chips. Fluid event system 122 is configured to receive and manage transaction details for fluid events (e.g., requests/bids from agents on behalf of the parties) for computational resources. As mentioned above, the bids will comprise an amount of the fixed quantity of chips pursuant allocated to a party. Chip management system 124 is configured to manage the quantity of chips allocated to the parties, including debiting the fixed quantity of chips allocated to a party by the amount bid by that party in response to the party being awarded the computational resource.

For example, in one embodiment, the invention provides a computer-readable/useable medium that includes computer program code to enable a computer infrastructure to allocate resources using fluid, depleting chips. To this extent, the computer-readable/useable medium includes program code that implements each of the process(es) of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 4) and/or storage system 116 (FIG. 4) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to allocate resources based on fluid, depleting chips. In this case, the service provider can create, maintain, support, etc., a computer infrastructure, such as computer infrastructure 102 (FIG. 4) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for allocating resources based on depleting chips. In this case, a computer infrastructure, such as computer infrastructure 102 (FIG. 4), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as resource unit broker 28 (FIG. 4), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for fluidly allocating a supply of depleting chips for obtaining desired service level characteristics of a supply of computational resources, the method comprising:

allocating each of a plurality of parties a fixed quantity of chips for bidding on a computational resource, using at least one computerized device;

receiving a first unscheduled bid for the computational resource from a first party of the plurality of parties, the first unscheduled bid using an amount of the fixed quantity of chips of the first party, using the least one computerized device;

receiving a second unscheduled bid for the computational resource from a second party of the plurality of parties, the second unscheduled bid using an amount of the fixed quantity of chips of the second party, using the least one computerized device;

selecting a strategy for allocating the computational resource after receiving the first unscheduled bid and the second unscheduled bid, the strategy selected from a group of strategies consisting of: winner take all, ratio of resources, and harvested capacity, the selecting performed using the at least one computerized device;

determining, in response to the receiving of the second bid, based on the selected strategy, the first unscheduled bid, and the second unscheduled bid, a winning bid for the computational resource for an unguaranteed period of time, the determining performed using the at least one computerized device; and debiting the quantity of chips of the party corresponding to the winning bid by the amount in response to the party being awarded the computational resource, using the least one computerized device.

2. The method of claim 1, the allocating comprising allocating each of the plurality of parties the fixed quantity of chips pursuant to a business transaction.

3. The method of claim 2, the business transaction being a financial transaction.

4. The method of claim 1, wherein the unscheduled bid is received by a resource unit broker from an agent acting on behalf of the first party or the second party.

5. The method of claim 4, wherein the strategy is selected by the resource unit broker.

6. A computer system for fluidly allocating a supply of depleting chips for obtaining desired service level characteristics of a supply of computational resources, the system comprising:

a system for allocating each of a plurality of parties party a fixed quantity of chips for bidding on a computational resource;

a system for receiving a first unscheduled bid for the computational resource from a first party of the plurality of parties, the first unscheduled bid using an amount of the fixed quantity of chips of the first party;

a system for receiving a second unscheduled bid for the computational resource from a second party of the plurality of parties, the second unscheduled bid using an amount of the fixed quantity of chips of the second party;

a system for selecting a strategy for allocating the computational resource after receiving the first unscheduled bid and the second unscheduled bid, the strategy selected from a group of strategies consisting of: winner take all, ratio of resources, and harvested capacity;

a system for determining, in response to the receiving of the second bid, based on the selected strategy, the first unscheduled bid, and the second unscheduled bid, a winning bid for the computational resource for an unguaranteed period of time; and a system for debiting the quantity of chips of the party corresponding to the winning bid by the amount in response to the party being awarded the computational resource.

7. The system of claim 6, the fixed quantity of chips being allocated pursuant to a business transaction.

8. The system of claim 7, the business transaction being a financial transaction.

9. The system of claim 6, wherein the unscheduled bid is received by a resource unit broker from an agent acting on behalf of the first party or the second party.

10. The system of claim 9, wherein the strategy is selected by the resource unit broker.

11. A program product stored on a computer readable medium for fluidly allocating a supply of depleting chips for obtaining desired service level characteristics of a supply of computational resources, the computer readable medium comprising program code for causing a computer system to:

allocate each of a plurality of parties a fixed quantity of chips for bidding on a computational resource;

receive a first unscheduled bid for the computational resource from a first party of the plurality of parties, the first unscheduled bid using an amount of the fixed quantity of chips of the first party;

receive a second unscheduled bid for the computational resource from a second party of the plurality of parties, the second unscheduled bid using an amount of the fixed quantity of chips of the second party;

select a strategy for allocating the computational resource after receiving the first unscheduled bid and the second unscheduled bid, the strategy selected from a group of strategies consisting of: winner take all, ratio of resources, and harvested capacity;

determine, in response to the receiving of the second bid, based on the selected strategy, the first unscheduled bid, and the second unscheduled bid, a winning bid for the computational resource for an unguaranteed period of time; and debit the quantity of chips of the party corresponding to the winning bid by the amount in response to the party being awarded the computational resource.

12. The program product of claim 11, the fixed quantity of chips being allocated pursuant to a business transaction.

13. The program product of claim 12, the business transaction being a financial transaction.

14. The program product of claim 11, wherein the unscheduled bid is received by a resource unit broker from an agent acting on behalf of the first party or the second party.

15. The program product of claim 14, wherein the strategy is selected by the resource unit broker.

16. A method for deploying a system for fluidly allocating a supply of depleting chips for obtaining desired service level characteristics of a supply of computational resources, the comprising:

providing a computer infrastructure being operable to:

allocate each of a plurality of parties a fixed quantity of chips for bidding on a computational resource;

receive a first unscheduled bid for the computational resource from a first party of the plurality of parties, the first unscheduled bid using an amount of the fixed quantity of chips of the first party;

receive a second unscheduled bid for the computational resource from a second party of the plurality of parties, the second unscheduled bid using an amount of the fixed quantity of chips of the second party;

select a strategy for allocating the computational resource after receiving the first unscheduled bid and the second unscheduled bid, the strategy selected from a group of strategies consisting of: winner take all, ratio of resources, and harvested capacity;

determine, in response to the receiving of the second bid, based on the selected strategy, the first unscheduled bid, and the second unscheduled bid, a winning bid for the computational resource for an unguaranteed period of time; and debit the quantity of chips of the party corresponding to the winning bid by the amount in response to the party being awarded the computational resource.

17. The method of claim 16, the fixed quantity of chips being allocated pursuant to a business transaction, wherein the business transaction is a financial transaction.

18. The method of claim 1, wherein:

the winner take all strategy includes: allocating the entire computational resource to one of the plurality of parties with the highest bid, after an end of the unguaranteed period of time;

the ratio of resources strategy includes: allocating a portion of the computational resource to a first winning party of the plurality of parties, the first winning party having a higher bid than a second winning party of the plurality of parties, and further allocating a smaller portion of the computational resource to the second winning party, wherein the allocating occurs at a plurality of times within the unguaranteed period of time; and the harvested capacity strategy includes: allocating a portion of the computational resource to a first winning party of the plurality of parties, the first winning party having a higher bid than a second winning party of the plurality of parties, wherein the portion of the computational resource is equal to an amount of computational resource needed by the first winning party, and further allocating a smaller portion of the computational resource to the second winning party.

19. The system of claim 6, wherein:

the winner take all strategy all includes using the system for determining to allocate the entire computational resource to one of the plurality of parties with the highest bid, after an end of the unguaranteed period of time;

the ratio of resources strategy includes using the system for determining to allocate a portion of the computational resource to a first winning party of the plurality of parties, the first winning party having a higher bid than a second winning party of the plurality of parties, and further allocate a smaller portion of the computational resource to the second winning party, wherein the allocating occurs at a plurality of times within the unguaranteed period of time; and the harvested capacity strategy includes using the system for determining to allocate a portion of the computational resource to a first winning party of the plurality of parties, the first winning party having a higher bid than a second winning party of the plurality of parties, wherein the portion of the computational resource is equal to an amount of computational resource needed by the first winning party, and further allocate a smaller portion of the computational resource to the second winning party.

20. The program product of claim 11, wherein:

the winner take all strategy includes: providing program code for causing a computer system to allocate the entire computational resource to one of the plurality of parties with the highest bid, after an end of the unguaranteed period of time;

the ratio of resources strategy includes: providing program code for causing a computer system to allocate a portion of the computational resource to a first winning party of the plurality of parties, the first winning party having a higher bid than a second winning party of the plurality of parties, and further allocate a smaller portion of the computational resource to the second winning party, wherein the allocating occurs at a plurality of times within the unguaranteed period of time; and the harvested capacity strategy includes: providing program code for causing a computer system to allocate a portion of the computational resource to a first winning party of the plurality of parties, the first winning party having a higher bid than a second winning party of the plurality of parties, wherein the portion of the computational resource is equal to an amount of computational resource needed by the first winning party, and further allocate a smaller portion of the computational resource to the second winning party.

21. The method for deploying a system of claim 16, wherein:

the winner take all strategy includes providing a computer infrastructure being operable to: allocate the entire computational resource to one of the plurality of parties with the highest bid, after an end of the unguaranteed period of time;

the ratio of resources strategy includes providing a computer infrastructure being operable to: allocate a portion of the computational resource to a first winning party of the plurality of parties, the first winning party having a higher bid than a second winning party of the plurality of parties, and further allocate a smaller portion of the computational resource to the second winning party, wherein the allocating occurs at a plurality of times within the unguaranteed period of time; and the harvested capacity strategy includes providing a computer infrastructure being operable to: allocate a portion of the computational resource to a first winning party of the plurality of parties, the first winning party having a higher bid than a second winning party of the plurality of parties, wherein the portion of the computational resource is equal to an amount of computational resource needed by the first winning party, and further allocate a smaller portion of the computational resource to the second winning party.

* * * * *